United States Patent
Rivolta et al.

(10) Patent No.: US 10,942,578 B2
(45) Date of Patent: Mar. 9, 2021

(54) SYSTEM AND METHOD FOR RECOGNITION OF THE GESTURE OF BRINGING A MOBILE ELECTRONIC DEVICE TO A USER EAR

(71) Applicant: STMICROELECTRONICS S.R.L., Agrate Brianza (IT)

(72) Inventors: Stefano Paolo Rivolta, Desio (IT); Federico Rizzardini, Settimo Milanese (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/566,759

(22) Filed: Sep. 10, 2019

(65) Prior Publication Data

US 2020/0081546 A1 Mar. 12, 2020

(30) Foreign Application Priority Data

Sep. 12, 2018 (IT) .................. 102018000008536

(51) Int. Cl.
*G06F 3/01* (2006.01)
*H04M 1/725* (2021.01)

(52) U.S. Cl.
CPC ........ *G06F 3/017* (2013.01); *H04M 1/72519* (2013.01); *H04M 2250/12* (2013.01)

(58) Field of Classification Search
CPC ......... G06F 1/1694; G06F 3/017; G06F 3/167
See application file for complete search history.

(56) References Cited

U.S. PATENT DOCUMENTS

| | | | |
|---|---|---|---|
| 9,292,102 B2 | 3/2016 | Nasiri et al. | |
| 9,720,515 B2 | 8/2017 | Wagner et al. | |
| 10,254,879 B1* | 4/2019 | Oral | G06F 3/044 |
| 10,386,203 B1* | 8/2019 | Zheng | G01C 19/5776 |
| 2009/0209293 A1* | 8/2009 | Louch | H04M 1/6041 |
| | | | 455/566 |
| 2012/0100889 A1* | 4/2012 | Kim | H04M 1/72519 |
| | | | 455/556.1 |
| 2012/0306770 A1* | 12/2012 | Moore | G06F 3/01 |
| | | | 345/173 |
| 2014/0302894 A1* | 10/2014 | Woo | H04W 52/0254 |
| | | | 455/566 |
| 2015/0123898 A1* | 5/2015 | Kim | H04L 51/24 |
| | | | 345/156 |

(Continued)

FOREIGN PATENT DOCUMENTS

| | | |
|---|---|---|
| CN | 105929936 A | 9/2016 |
| CN | 107330240 A | 11/2017 |

(Continued)

*Primary Examiner* — Devan A Sandiford
(74) *Attorney, Agent, or Firm* — Seed IP Law Group LLP (57) ABSTRACT

A system recognizes a gesture of bringing a mobile electronic device to a user ear. The system may be integrated in the mobile electronic device and is provided with a movement sensor which provides a movement signal indicative of the movement of the mobile electronic device. A pressure sensor provides a pressure signal indicative of a pressure acting on the mobile electronic device during the movement. A processing stage performs a joint processing of the movement signal and of the pressure signal in order to recognize the gesture.

17 Claims, 7 Drawing Sheets

(56) References Cited

U.S. PATENT DOCUMENTS

| | | | |
|---|---|---|---|
| 2015/0193232 A1* | 7/2015 | Keal | A61B 5/1123 |
| | | | 702/150 |
| 2015/0313552 A1 | 11/2015 | Zhang et al. | |
| 2017/0262065 A1* | 9/2017 | Elkins | G06F 3/017 |
| 2018/0088681 A1* | 3/2018 | Zhou | H04M 1/725 |

FOREIGN PATENT DOCUMENTS

| | | |
|---|---|---|
| CN | 107589782 A | 1/2018 |
| KR | 10-2018-0060541 A | 6/2018 |
| WO | 2015/101016 A1 | 7/2015 |

* cited by examiner

SYSTEM AND METHOD FOR RECOGNITION OF THE GESTURE OF BRINGING A MOBILE ELECTRONIC DEVICE TO A USER EAR

BACKGROUND

Technical Field

The present solution relates to a system for recognizing the gesture of bringing a mobile electronic device to a user ear and a corresponding method for recognizing the aforesaid gesture.

Description of the Related Art

As is known, systems for recognition of gestures are commonly implemented in so-called smartphones, i.e., latest-generation mobile phones, or in similar mobile electronic devices, such as phablets or tablets, in order to enable some functions, such as opening of the camera or video camera application, or display notifications on the screen.

In particular, recognition of the gesture of bringing the mobile electronic device to the ear (this gesture being referred to as "phone-to-ear gesture" in the most common case of use in a smartphone or similar mobile electronic device with mobile-communication capacity) is commonly implemented in order to handle an incoming call, and in particular in order to automatically activate a reply to the call and turning-off of the screen.

The aforesaid phone-to-ear gesture in general includes any movement that the user commonly performs in bringing the mobile electronic device up to his or her ear, irrespective of the initial position of the user and of the mobile electronic device. For example, the following possible situations may arise:

user sitting down and mobile electronic device lying on a table (or similar resting surface);
user sitting down and mobile electronic device in the user's pocket (or similar housing);
user standing up and mobile electronic device lying on a table (or similar resting surface);
user standing up and mobile electronic device in the user's pocket (or similar housing); and
other situations (for example, user walking, user moving in a lift, user lying down, etc.).

The system for recognition of the aforesaid phone-to-ear gesture currently envisages use of a proximity sensor, appropriately located at a front surface of the mobile electronic device (which carries the display, normally of a touch-screen type), typically in a top portion of the same front surface. The proximity sensor detects approach to the ear of the user and generates a corresponding signal, which is sent to the operating system of the mobile electronic device for implementing appropriate functions (in particular, of automatic response and turning-off of the screen).

For instance, the proximity sensor may be implemented with optical technology, via generation, by a source, of a beam of light radiation, for example, a laser beam, and reception, by a receiver, of the beam reflected by a surface on which the beam impinges (in the case in point, the ear). Appropriate algorithms are then implemented, for example a time-of-flight algorithm, in order to determine the distance between the source of emission and the reflecting surface.

Use of the aforesaid proximity sensor is currently considered as necessary for handling calls in mobile electronic devices.

Moreover known is the tendency, among manufacturers of mobile electronic devices, to increase the dimensions of the screen, at the same time limiting the increase in overall dimensions of the mobile electronic devices, a tendency that has led to a reduction of the frame surrounding the screen and to a so-called borderless design.

The presence of some sensors required for operation of mobile electronic devices, amongst which in particular the aforesaid proximity sensor, which has to be positioned, as mentioned previously, at the top portion of the front surface of the device, limits, however, the possibility of reduction of the top border of the frame surrounding the screen.

To overcome, at least in part, the above problem, some manufacturers have proposed introduction of the so-called notch, i.e., of a recess made on the top part of the screen, so as to house the aforesaid sensors, amongst which the proximity sensor.

However, this solution, in addition to having a significant aesthetic impact, in any case entails a certain reduction of the dimension available for the display area. Therefore, the need is certainly felt to reduce, as far as possible, the area occupied by the aforesaid notch.

The present Applicant has moreover realized that the proximity sensor, in addition to entailing a considerable occupation of area (the package of a proximity sensor currently available on the market has, for example, dimensions in the region of $5\times3\times1$ mm$^3$), requires a significant consumption of electrical energy.

In general, the presence of the proximity sensor represents a cost for the manufacturer and inevitably increases the complexity of the printed-circuit board (PCB) of the mobile electronic device (for example, in terms of definition of the electrical paths and in terms of design constraints, due to the need to arrange the proximity sensor in a given position).

BRIEF SUMMARY

Embodiments of the present disclosure enable at least some of the above mentioned drawbacks of the prior art to be overcome.

According to embodiments of the present disclosure, a system and a method for recognition of the gesture of bringing a mobile electronic device to a user ear are provided.

In an embodiment of the present disclosure, a system provides for the recognition of the gesture of bringing a mobile electronic device to a user ear. The system is configured to be integrated in the mobile electronic device and includes a movement sensor configured to provide a movement signal indicative of the movement of the mobile electronic device. A pressure sensor is configured to provide a pressure signal indicative of the pressure acting on the mobile electronic device during the movement. A processing stage is operatively coupled to the movement sensor and to the pressure sensor and is configured to perform a joint processing of the movement signal and the pressure signal to recognize the gesture of bringing a mobile electronic device to a user ear.

BRIEF DESCRIPTION OF THE SEVERAL VIEWS OF THE DRAWINGS

For a better understanding of the present disclosure, preferred embodiments thereof are now described, purely by way of non-limiting example, with reference to the attached drawings, wherein.

DETAILED DESCRIPTION

As will be clarified in detail, the present solution provides an alternative to the use of a proximity sensor for recognition of the gesture of bringing a mobile electronic device to a user ear (in what follows, referred to for simplicity as a "phone-to-ear gesture"), consequently enabling an implementation for detecting such a gesture without a proximity sensor.

For this purpose, an aspect of the present solution envisages exploitation of sensors normally present in a mobile electronic device and already used for other functions, and in particular envisages joint use, with a so-called sensor-fusion algorithm, of: a movement sensor, in particular an accelerometer sensor with three axes of detection, which is commonly used in mobile electronic devices for several functions, amongst which include the functions of a pedometer, screen rotation, orientation, etc.; and a pressure sensor, which is also commonly present and used for functions such as a barometer/altimeter function or in combination with the pedometer for supplying additional indications, for example, in terms of a more accurate count of the calories or for the so-called floor-detection/counting function.

Figure 1:
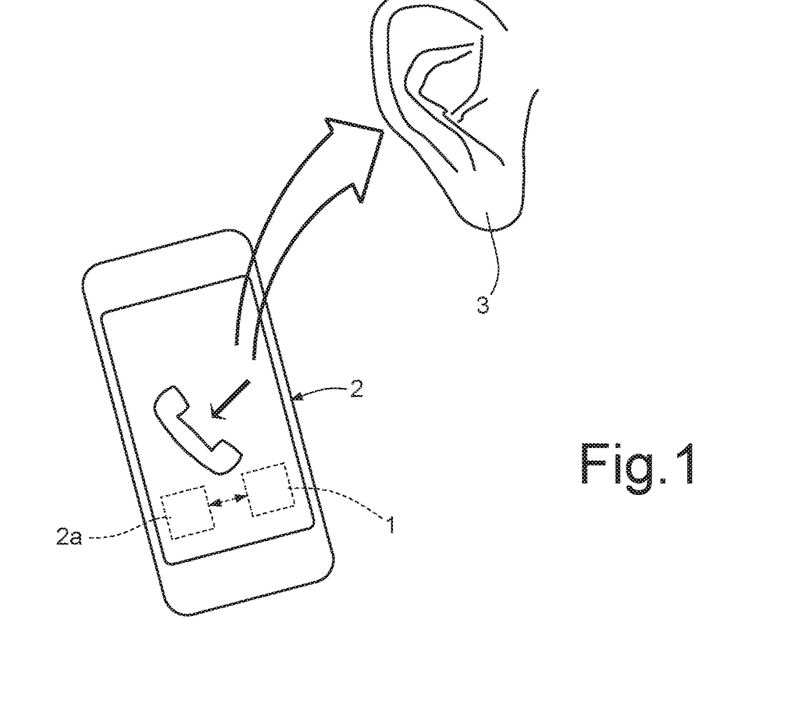
FIG. 1 schematically represents the gesture of an approach to a user ear of a mobile device in which a recognition system according to embodiments of the present disclosure is implemented.

With initial reference to FIG. 1, a recognition system 1 is now described, which can be implemented within a mobile electronic device 2 for recognizing the gesture of bringing the mobile electronic device 2 to a user ear 3, in particular for handling an incoming call (as represented schematically through the telephone icon in the figure).

The mobile electronic device 2 is provided with a control unit 2a, which implements an appropriate operating system and is coupled to the recognition system 1 so as to activate appropriate functions upon recognition of the gesture of approach, for example, for handling the aforesaid call.

Figure 2:
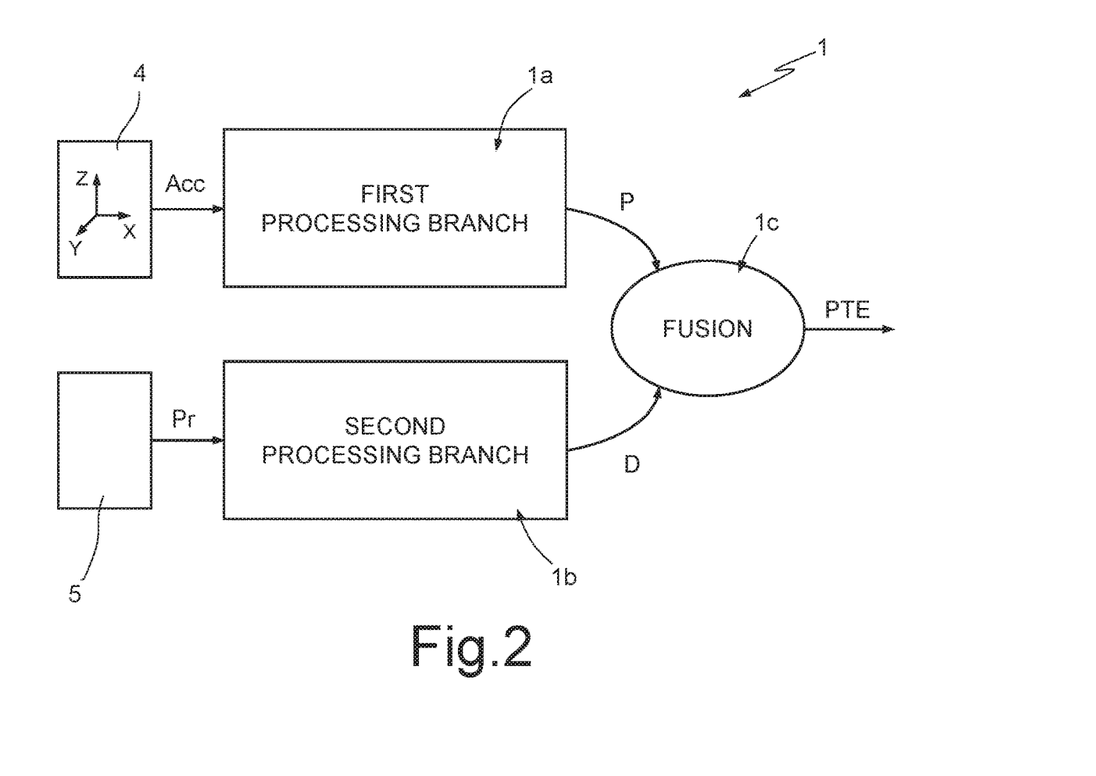
FIG. 2 is a general block diagram of a recognition system according to an embodiment of the present disclosure.

As illustrated schematically in FIG. 2, the recognition system 1 includes a movement sensor 4, in particular an accelerometer with three axes of detection x, y, and z, which provides a movement signal, in particular an acceleration signal Acc having acceleration components $Acc_x$, $Acc_y$, and $Acc_z$ along the three axes of detection x, y, and z, which form a set of mutually orthogonal Cartesian axes. The movement signal is indicative of the movement, in particular the acceleration acting on the mobile electronic device 2. A pressure sensor 5 provides a pressure signal Pr indicative of the pressure acting on the mobile electronic device 2 during the same movement of the mobile electronic device 2.

Advantageously, the movement sensor 4 and the pressure sensor 5 may be integrated with MEMS (Micro-Electro-Mechanical System) semiconductor technology so as to have a reduced occupation of area and reduced power consumption.

The recognition system 1 further includes:
a first processing branch 1a operatively coupled to the movement sensor 4 and configured to suitably process (as described in detail hereinafter) the acceleration signal Acc to provide at the output a movement information P associated with recognition of the phone-to-ear gesture;
a second processing branch 1b operatively coupled to the pressure sensor 5 and configured to suitably process (as described in detail hereinafter) the pressure signal Pr to provide at the output a vertical-displacement (i.e. height variation) information D, as a result of the aforesaid movement, being also associated with the recognition of the phone-to-ear gesture; and
a fusion block 1c operatively coupled to the first and second processing branches 1a, 1b is configured to implement a joint-analysis algorithm (using a sensor-fusion technique) based on the movement information P provided by the aforesaid first processing branch 1a and the vertical-displacement information D provided by the aforesaid second processing branch 1b so as to supply at the output a recognition signal PTE indicative of recognition of the phone-to-ear gesture.

The first and second processing branches 1a, 1b and the fusion block 1c may be implemented by means of a processing unit, of a digital type, for example a microprocessor or a microcontroller, distinct from the control unit 2a (here not illustrated) where the operating system of the mobile electronic device 2 is implemented, or else may be implemented, either totally or in part, within the same control unit 2a of the mobile electronic device 2.

Moreover, the first and second processing branches 1a, 1b and the fusion block 1c may be implemented, either totally or in part, in hardware, by means of a suitable programmable logic.

Figure 3:
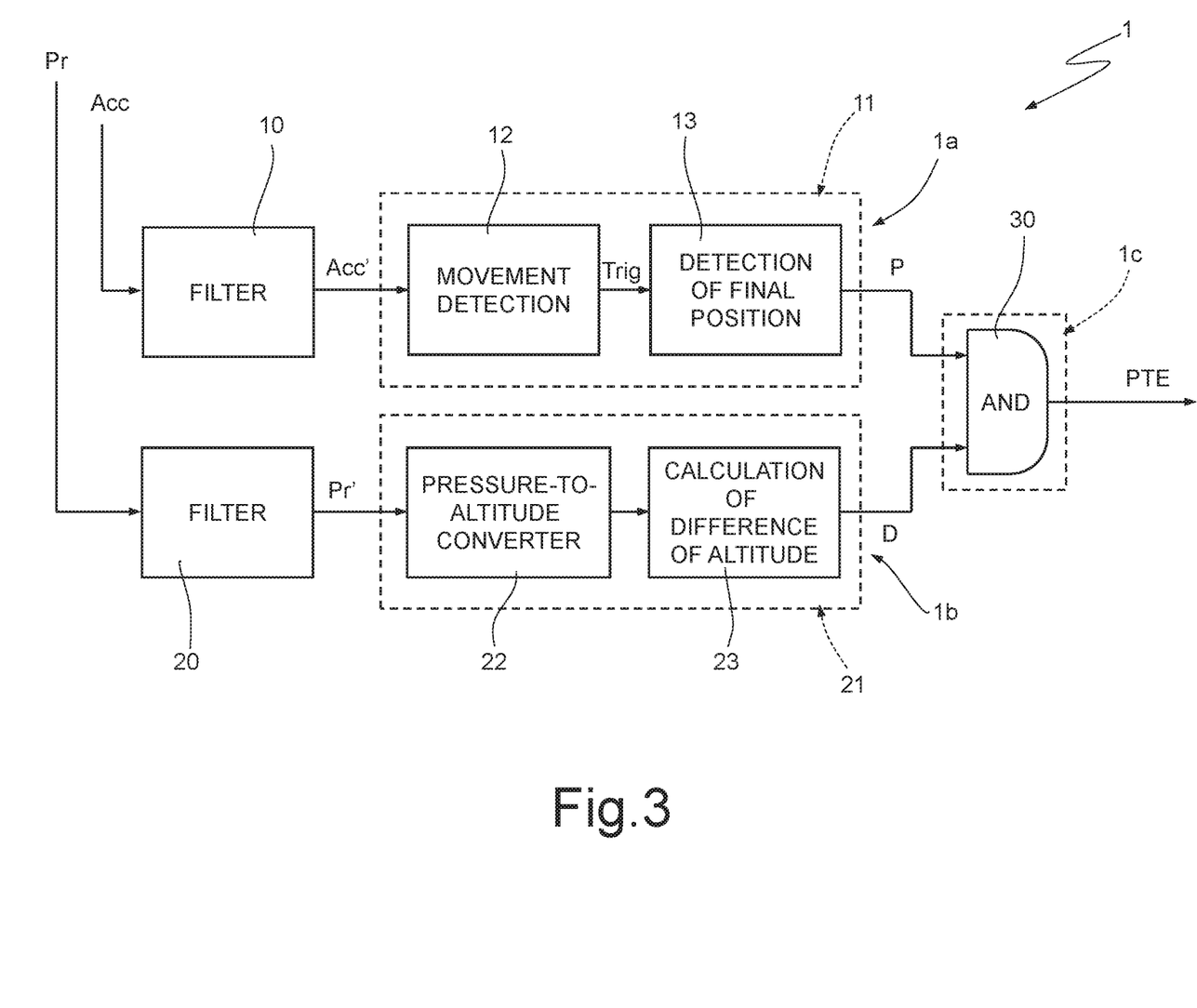
FIG. 3 is a more detailed block diagram of a possible embodiment of the a recognition system according to an embodiment of the present disclosure.

In greater detail, and as illustrated in FIG. 3, in a possible embodiment, the first processing branch 1a includes:
a filtering stage 10 configured to receive at its input the acceleration signal Acc and implement a pre-conditioning of the same acceleration signal Acc by filtering (for example, of a band-stop type, for removing spurious frequencies in a given frequency band, for example associated with the gait of the user, or of a low-pass type for removing high-frequency components, for example associated with noise), and to provide at its output a filtered acceleration signal Acc'; and
a movement-detection stage 11 is coupled to the filtering stage 10 to receive the filtered acceleration signal Acc', and is configured to implement a processing of the same filtered acceleration signal Acc' to recognize a movement associated with the phone-to-ear gesture and to generate the corresponding movement information P.

The aforesaid movement-detection stage 11 may be implemented with different techniques, also according to the available computing capacity, amongst which include:
a simple signal analysis, for example using appropriate acceleration thresholds and associated time intervals where the signal stay above/below the same acceleration thresholds;
more complex techniques of automatic learning (so-called machine learning), for example including support-vector machines (SVMs), decision trees, or neural networks, and using an appropriate combination of signal features, for example maximum and minimum values, variance, mean value, energy, peak-to-peak value, etc.; or an appropriate combination of the aforesaid signal-analysis and automatic-learning techniques.

In a possible embodiment, illustrated in the aforesaid FIG. 3, the movement-detection stage 11 includes:

a movement (or pattern) detection block 12 which receives the filtered acceleration signal Acc' and performs an appropriate analysis of variation of the filtered acceleration signal Acc' to verify the presence of a pattern compatible with the phone-to-ear gesture and, if it is compatible, providing a trigger signal Trig; and a final-position detection block 13 coupled to the output of the pattern-detection block 12 and configured, upon reception of the trigger signal Trig, to evaluate, based on the filtered acceleration signal Acc', whether the final position of the mobile electronic device 2 (assumed following upon the movement associated with the aforesaid pattern detection) is compatible with a possible orientation of the mobile electronic device 2 close to, or resting against, the user ear 3 (FIG. 1).

Basically, the final-position detection block 13 is configured to confirm the pattern detected by the pattern-detection block 12 and to provide the movement information P, which, in this case, represents an index of reliability (or a probability) of recognition of the phone-to-ear gesture. In a simpler embodiment, the movement information P may have a Boolean value, "true" or "false" ("1" or "0"), according to whether the movement information P does, or does not, represent recognition of the phone-to-ear gesture.

It should be noted that the aforesaid first processing branch 1a may be modified, according to the specific application and requirements, in several ways, for example by:

envisaging, or not, the presence of the filtering stage 10 (for example, the filtering stage 10 cannot be provided if the movement sensor 1 is itself provided with filtering capacity and hence supplies an internally pre-processed acceleration signal Acc);

implementing a simple pattern-detection block 12 and a more accurate final-position detection block 13;

implementing a more accurate pattern-detection block 12 and a simple final-position detection block 13; or implementing both an accurate pattern-detection block 12 and an accurate final-position detection block 13.

In a possible embodiment, the pattern-detection block 12 may be configured to analyze, at a current instant, the variation of the acceleration signal Acc (possibly of the filtered acceleration signal Acc') with respect to a previous instant, to verify the presence of a substantial signal variation. In particular, the pattern-detection block 12 may, for this purpose, evaluate a variance (for example, an exponential variance) of the acceleration signal Acc. In the case where the variation is significant, for example, being higher than a certain threshold (possibly for a pre-set time interval), the pattern-detection block 12 can generate the trigger signal Trig for the final-position detection block 13.

In a possible embodiment, the above final-position detection block 13 may be configured to analyze the value of the acceleration components $Acc_x$, $Acc_y$, and $Acc_z$ of the acceleration signal Acc (possibly the filtered acceleration signal Acc') along the three axes of detection x, y, and z, in order to determine whether the corresponding position of the mobile electronic device 2 is compatible with a position assumed in the proximity of the user ear 3.

In particular, assuming the mobile electronic device 2 to be substantially stationary in the proximity of the user ear 3, the movement sensor 4 basically detects just the acceleration of gravity g, and the orientation of the mobile electronic device 2 determines how the acceleration of gravity g distributes along the three axes of detection x, y, and z (belonging to a reference system fixed with respect to the mobile electronic device 2). Consequently, the evaluation of the amplitude of the acceleration components $Acc_x$, $Acc_y$, and $Acc_z$ allows obtaining an estimate of the spatial orientation of the mobile electronic device 2, and the final-position detection block 13, based on this estimate, is able to determine whether this spatial orientation is consistent with the position of the device facing the user ear 3. In this way, the final-position detection block 13 may generate the movement information P, i.e., the index of reliability of recognition of the phone-to-ear gesture.

Figure 4A:
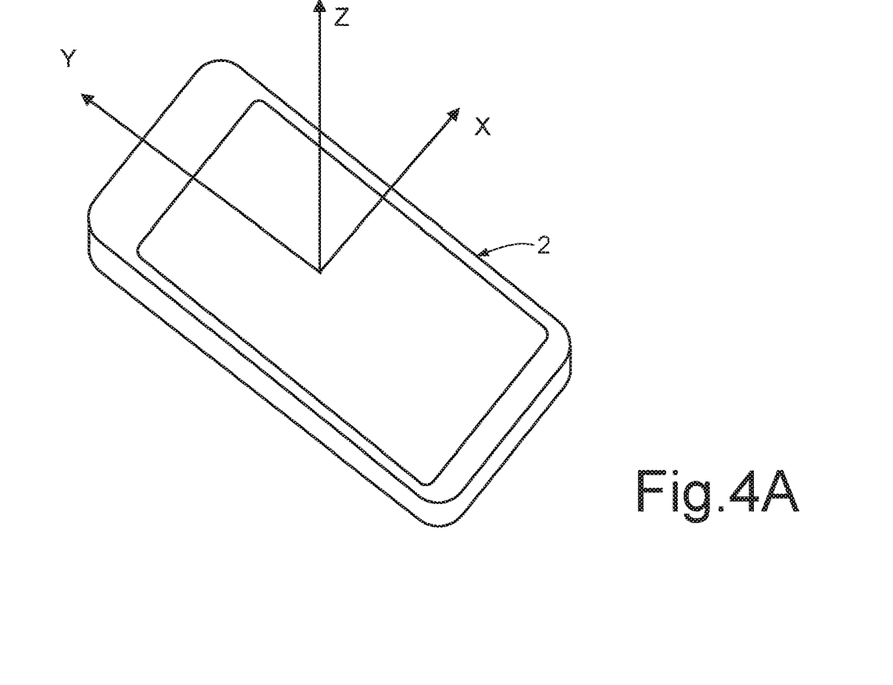
FIGS. 4A-4B depict the arrangement of a reference system fixed with respect to the mobile electronic device in embodiments of the present disclosure described herein.
Figure 4B:
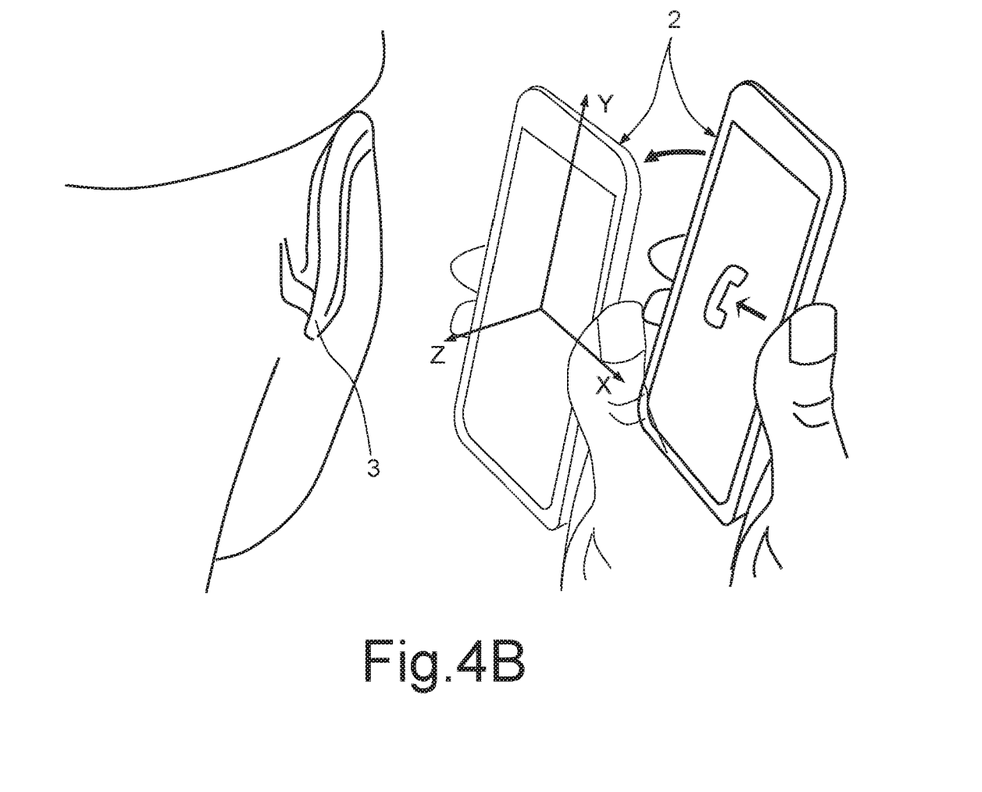

FIGS. 4A-4B show a possible arrangement of the reference system xyz fixed with respect to the mobile electronic device 2 (considered with the screen facing upwards, i.e., towards the observer) and of the three axes of detection x, y, z of the movement sensor 4, according to the so-called ENU (East North Up) convention. In particular, according to the ENU convention, the detection axis x is directed towards East, the detection axis y is directed towards the North, and the detection axis z is directed upwards.

Using the ENU convention, with reference also to FIG. 4B, it is possible to verify that, when the mobile electronic device 2 is arranged facing the user ear 3, the acceleration component $Acc_y$ is typically positive with absolute value depending on the angle of inclination of the mobile electronic device 2 (being maximum with the device almost perpendicular and minimum with the device almost parallel with respect to the direction of the force of gravity). The acceleration component $Acc_z$ has a low value, close to zero and in any case lower than a pre-set threshold; and the acceleration component $Acc_x$ has a positive or negative value (according to whether the mobile electronic device 2 is carried in the right hand or in the left hand of the user) that also depends on the angle of inclination of the mobile electronic device 2 (being, in absolute value, maximum with the device almost parallel and minimum with the device almost perpendicular with respect to the direction of the force of gravity).

The final-position detection block 13, in the embodiment described, can hence analyze the value, with sign, of the acceleration component $Acc_y$ and the absolute value of the acceleration components $Acc_x$ and $Acc_z$ with respect to respective acceleration thresholds in order to evaluate the final position of the mobile electronic device 2.

In a possible embodiment, illustrated once again in FIG. 3, the second processing branch 1b, which, as indicated previously, is configured to provide the vertical-displacement information D during movement of the mobile electronic device 2, includes:

a respective filtering stage 20 configured to receive at its input the pressure signal Pr and perform a pre-conditioning of the pressure signal Pr, via filtering (for example, of a low-pass type, to remove high-frequency components, for example associated with noise) to provide at its output a filtered pressure signal Pr; and a displacement-determination stage 21 coupled to the filtering stage 20 to receive the filtered pressure signal Pr' and configured to perform a processing of the filtered pressure signal Pr' to determine the vertical displacement undergone by the mobile electronic device 2 following upon movement.

In particular, the displacement-determination stage 21 is configured to calculate a difference between a current or actual pressure measurement (or altitude, given that, in a known way, the value of altitude is related via a formula to the pressure value) and a previous pressure (or altitude)

measurement, to determine the aforesaid vertical displacement. Advantageously, it may be possible to vary the time interval (for example, in the region of 1 s) that elapses between the current measurement and the previous measurement, an interval that corresponds to the latency for recognition of the phone-to-ear gesture. In this way, the displacement-determination stage 21 determines the vertical-displacement information D, which is supplied at the input of the fusion block 1c.

In a possible embodiment, illustrated in the aforesaid FIG. 3, the displacement-determination stage 21 includes:

a conversion block 22 is configured to receive the filtered pressure signal Pr' and to perform, by applying a known formula (here not described in detail), conversion between the pressure value and the altitude value; and a difference-calculation block 23 is operatively coupled to the conversion block 22 for calculating the difference between a current value of altitude and a previous value of altitude, so as to calculate the corresponding height difference, which represents in this case the vertical-displacement information D.

In a simpler implementation, the aforesaid vertical-displacement information D can be represented in Boolean form, for example in the following way: "0", if a given threshold of vertical displacement for recognition of the gesture is not exceeded; and "1", if the threshold of vertical displacement for recognition of the gesture is exceeded.

The fusion block 1c, as indicated previously, jointly processes the movement information P provided by the first processing branch 1a and the vertical-displacement information D provided by the second processing branch 1b, so as to determine recognition of the phone-to-ear gesture.

In particular, if the variation of height associated with the vertical-displacement information D is consistent with a possible movement of approach to the user ear, and moreover the index of reliability associated with the movement information P is higher than a (preferably selectable) threshold, the fusion block 1c yields a positive result and generates the corresponding recognition signal PTE, indicative of the correct recognition of the gesture of bringing the mobile electronic device 2 to the user ear 3.

In a possible embodiment, illustrated once again in FIG. 3, the fusion block 1c can be implemented by means of a simple AND logic block 30, which receives at its input the movement information P and the vertical-displacement information D and generates at its output the recognition signal PTE by means of AND logic combination of the aforesaid movement information P and vertical-displacement information D.

If the first processing branch 1a detects a pattern of movement consistent with bringing the device to the user ear (optionally evaluating whether the final position of the mobile device 2 is consistent), and moreover the second processing branch 1b detects a consistent vertical-displacement above the aforesaid selectable threshold, the AND logic block 30 determines the presence of the phone-to-ear gesture, and consequently generates the recognition signal PTE.

In an alternative implementation, having a higher computational complexity, the fusion block 1c can attribute a different and appropriate weight (for example, in terms of selection of an appropriate adaptive threshold) to the vertical-displacement information D, based on the movement information P.

For instance, in the case where the reliability index associated with the movement information P is high, the fusion block 1c can attribute a lower weight to the vertical-displacement information D. Instead, in the case where the movement information P has a low reliability index, the fusion block 1c can attribute a higher weight to the vertical-displacement information D, for final validation of recognition of the phone-to-ear gesture.

The present Applicant has verified, by means of tests and simulations, the reliability of the recognition system 1, as the possible situations of use vary.

Figure 5A:
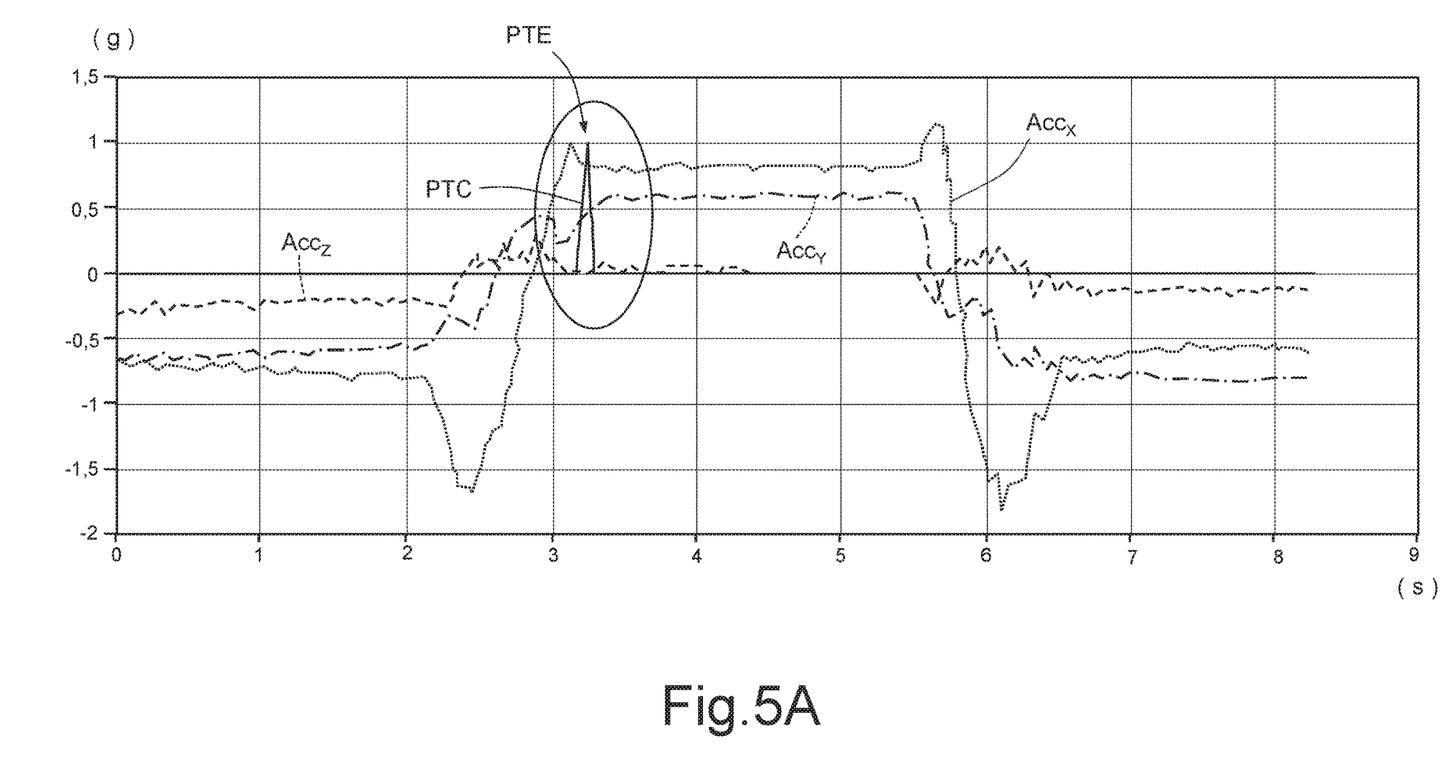
FIGS. 5A-5B, 6A-6B, and 7A-7B are plots of signals or quantities generated in embodiments of the recognition system of FIGS. 2-4.
Figure 5B:
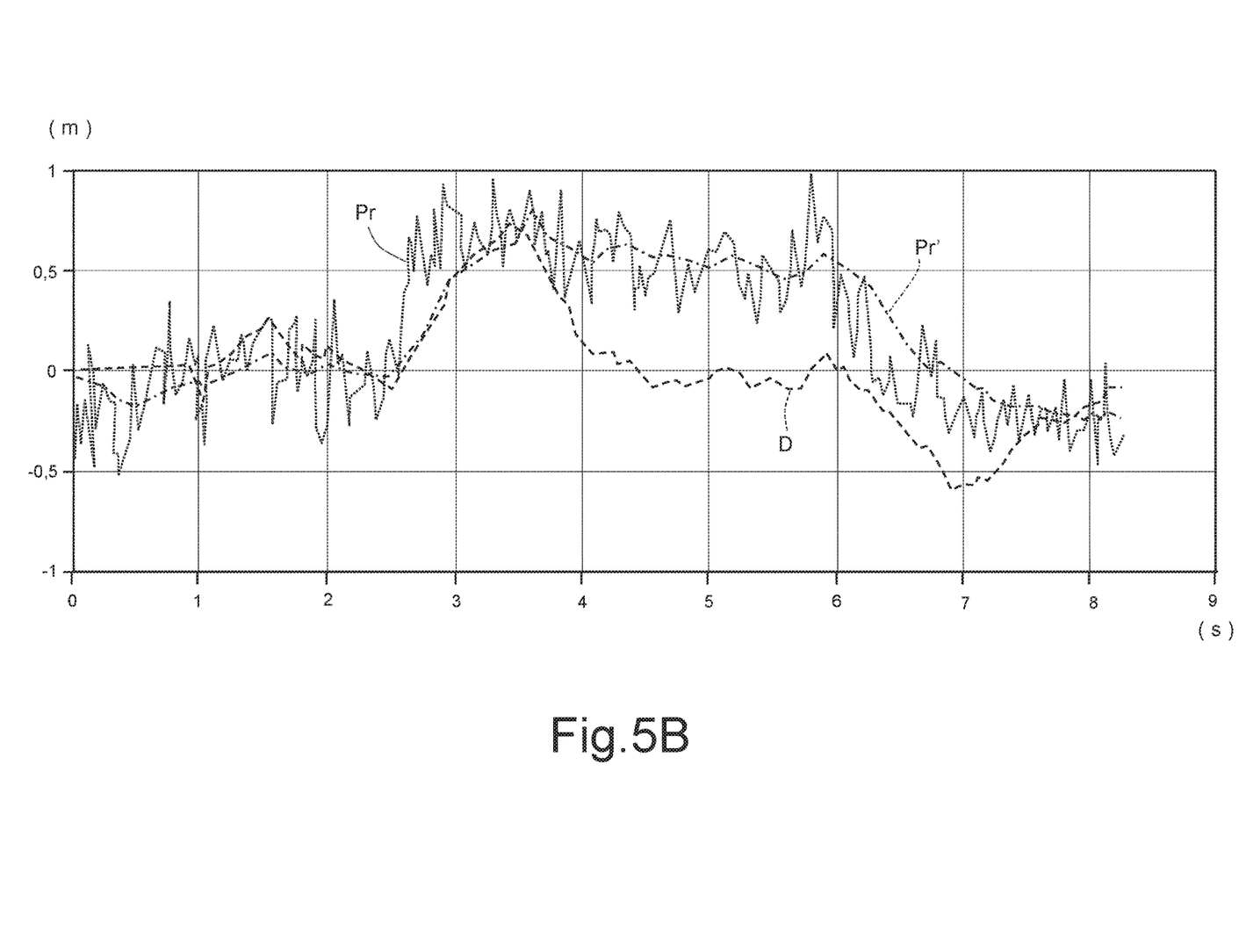

In this regard, FIGS. 5A and 5B refer to a correct recognition of the approach gesture in the case where the user is in an upright position. In particular, FIG. 5A shows the pattern of the components $Acc_x$, $Acc_y$, $Acc_z$ of the acceleration signal Acc (or filtered acceleration signal Acc'), and FIG. 5B shows the pattern of the pressure signal Pr (in the example, converted into altitude signal) and of the filtered pressure signal Pr' (which is also converted into altitude signal). As is shown by the recognition signal PTE (visible in FIG. 5A), which assumes, in an impulsive manner, a high value, the approach gesture is correctly recognized only when the pattern of movement is recognized (i.e., when an appropriate variation of the aforesaid acceleration components $Acc_x$, $Acc_y$, $Acc_z$ occurs, and moreover the final position of the mobile device 2 is consistent with its position facing the user ear 3), and moreover the vertical displacement D (illustrated in FIG. 5B) exceeds a certain selectable threshold. It should be noted that the vertical displacement D, in this condition of use, is rather high, for example approximately 60 cm.

Figure 6A:
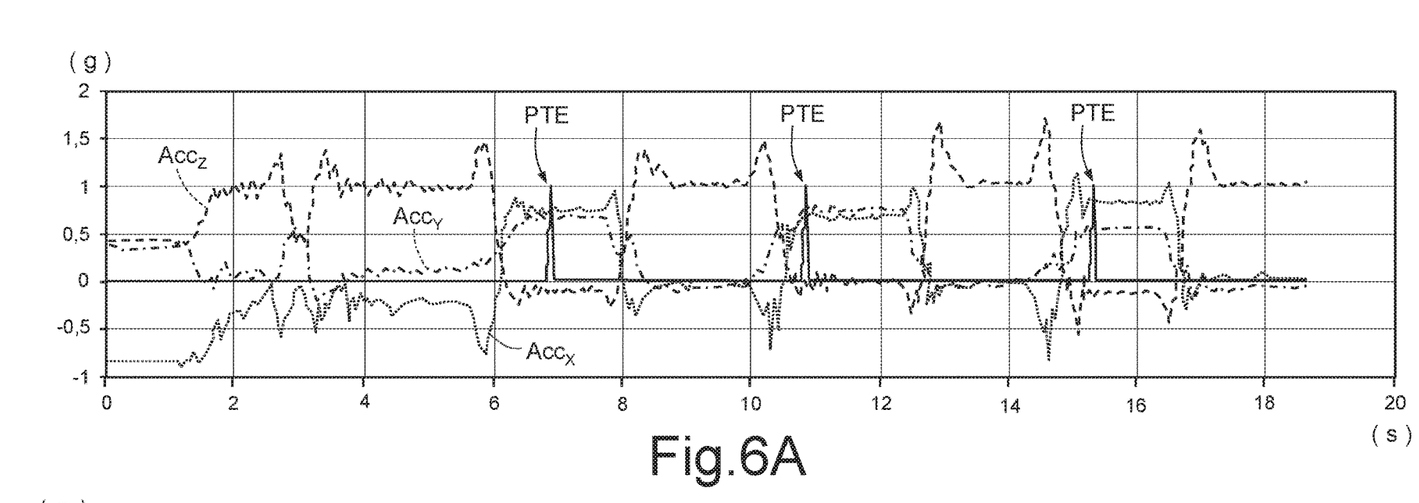
Figure 6B:
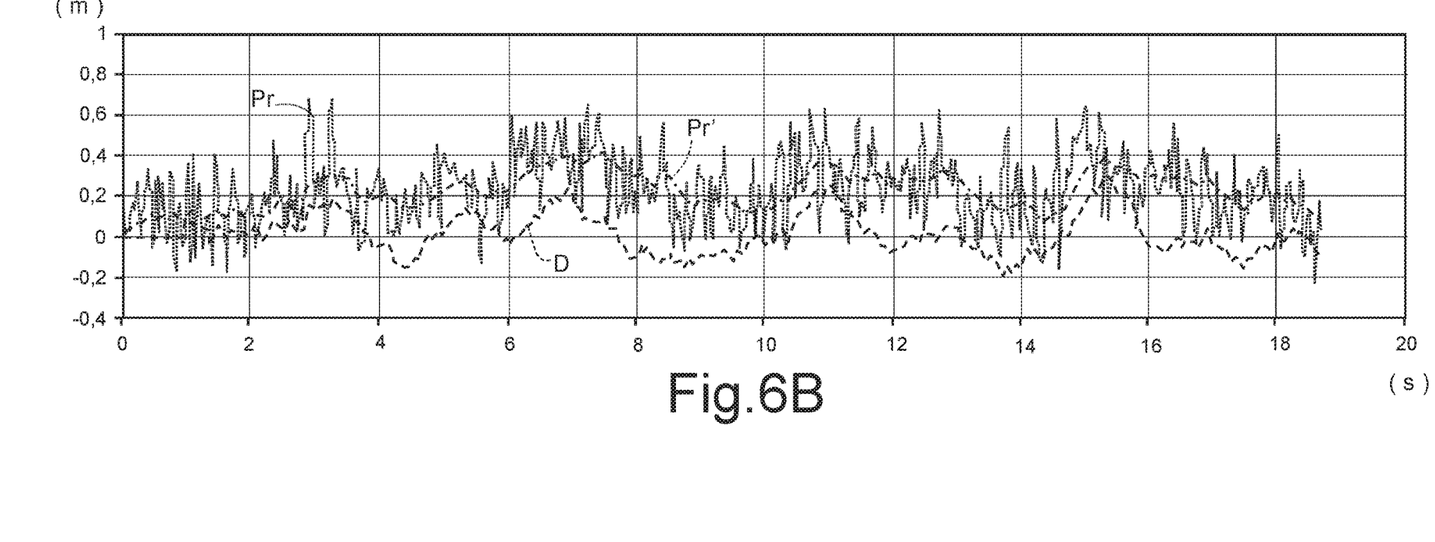

In an altogether similar manner, FIGS. 6A and 6B show recognition of the phone-to-ear gesture in the condition of use where the user is sitting down. In particular, three different events of recognition are illustrated (with the recognition signal PTE that consequently assumes the high value), corresponding to different inclinations of the mobile electronic device 2 facing the user ear 3 (corresponding to which are different values of the acceleration components $Acc_x$, $Acc_y$). In this case, the vertical displacement is less than in the previous case, for example being approximately 25 cm.

Figure 7A:
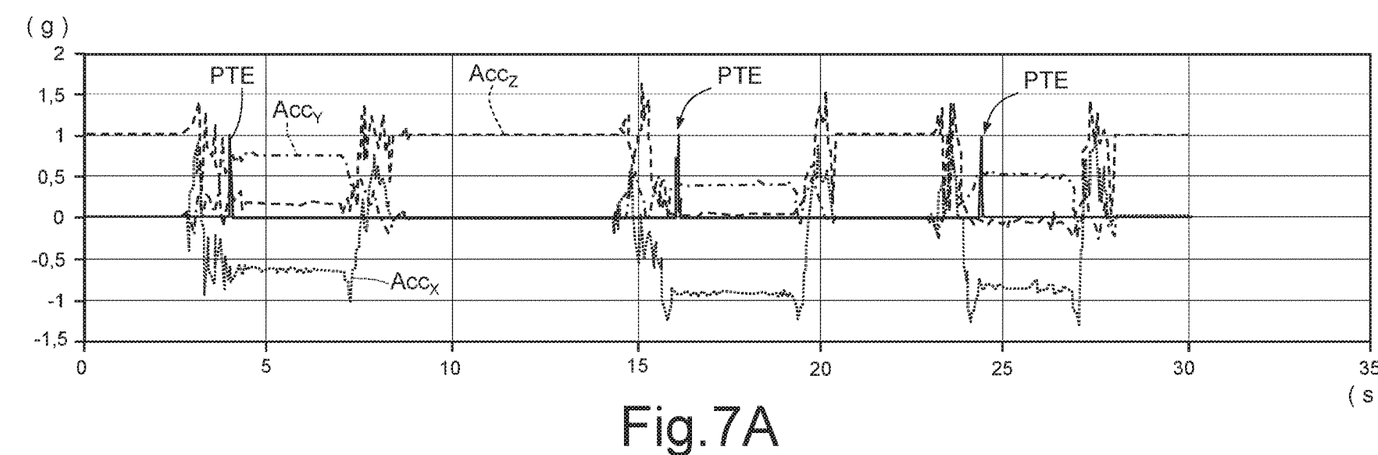
Figure 7B:
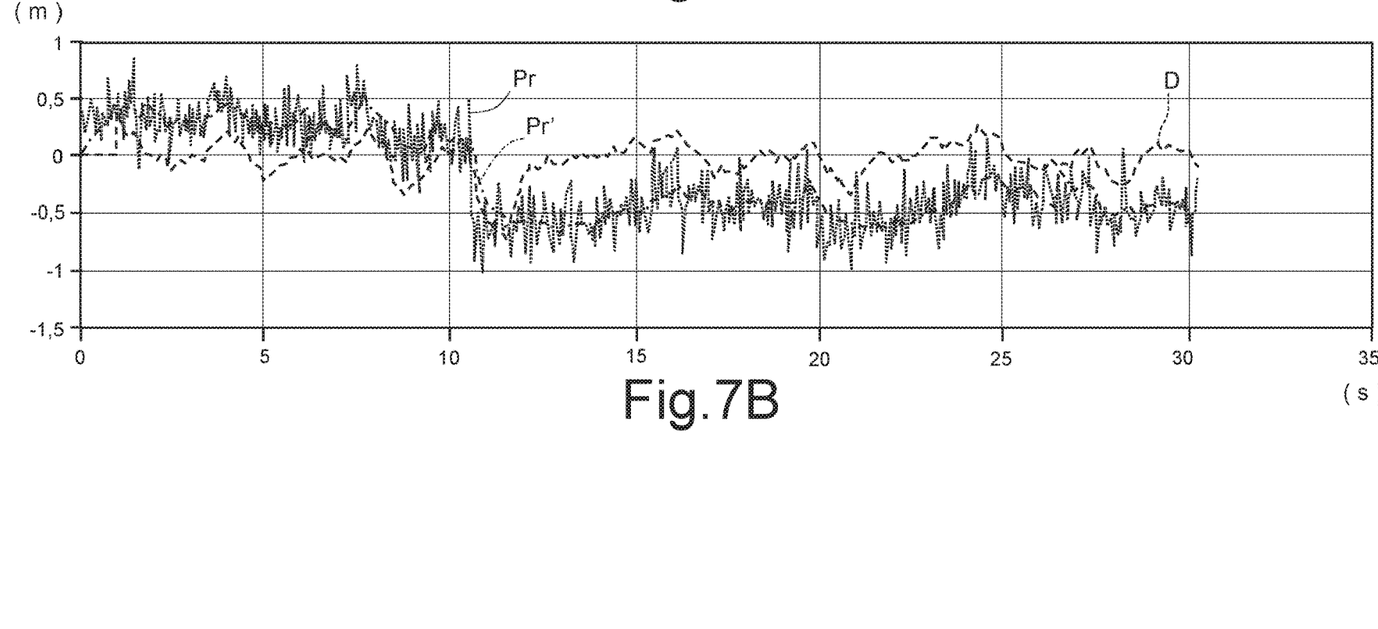

Moreover, FIGS. 7A and 7B show recognition of the phone-to-ear gesture in the situation of use with the mobile electronic device 2 initially lying on a table (or similar resting surface). Once again, various examples are shown in which the gesture is correctly recognized (the recognition signal PTE assuming the high value). In this case, recognition of the pattern of movement is facilitated by the fact that the starting position is always the same (with the mobile electronic device 2 stationary on the table or on a similar resting surface).

The advantages of the present solution emerge clearly from the foregoing description.

In any case, it is underlined that the aforesaid solution enables:

a reduction of the overall dimensions and a simplification in routing of the signals in the layout of the mobile electronic device 2, given the absence of a proximity sensor to be located at the top portion of the upper face of the mobile electronic device 2;

a reduction of the manufacturing costs, given the absence of the proximity sensor and the use of sensors (the movement sensor 4 and the pressure sensor 5) already present and used for other functions in the mobile electronic device 2; and a reduction of power consumption, given that the combined consumption of the movement sensor 4 and of the pressure sensor 5 is much lower (for example, just one tenth) of the consumption associated with the proximity sensor.

The solution described is moreover very simple and can be implemented by means of a microcontroller (or similar digital processing unit) with a reduced computational power (for example, using 8 bits), or else directly on silicon (thus obtaining a further reduction in the occupation of area and of power consumption), for example using a programmable logic circuit for the signal-processing operations.

Finally, it is clear that modifications and variations may be made to what has been described and illustrated herein, without thereby departing from the scope of the present disclosure, as defined in the annexed claims.

In particular, it is once again emphasized that the algorithm effectively implemented by the recognition system 1 may vary, being adaptable on the basis of the applications, requirements, and available processing capacity, as on the other hand has been previously pointed out.

Moreover, the first processing branch 1a may envisage the use of detection signals from further movement sensors (in a way not illustrated) in order to render the movement information P supplied at the output even more accurate, at the expense, however of a higher power consumption and a greater occupation of area.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for recognition of a gesture of bringing a mobile electronic device to a user ear, the system comprising:
   a movement sensor configured to provide a movement signal indicative of a movement of the mobile electronic device;
   a pressure sensor configured to provide a pressure signal indicative of a pressure acting on the mobile electronic device during the movement; and
   processing circuitry operatively coupled to the movement sensor and to the pressure sensor, and configured to perform a joint processing of the movement signal and the pressure signal to recognize the gesture, wherein the processing circuitry, in operation:
      analyzes variation of the movement signal to verify presence of a pattern compatible with the gesture and, if the presence of the pattern is verified, evaluates based on the movement signal, whether a final position of the mobile electronic device is compatible with an orientation of the mobile electronic device at the user ear;
      preconditions the pressure signal using filtering;
      processes the preconditioned pressure signal to determine a vertical displacement of the mobile electronic device as a result of the movement, the processing of the pressure signal including determining a difference between a current measurement of pressure or altitude associated with the pressure, and a previous measurement of pressure or altitude associated with the pressure, to determine the vertical displacement and generate vertical-displacement information; and
      implements a joint-analysis algorithm based on the evaluation of whether the final position of the mobile electronic device is compatible with the orientation of the mobile electronic device at the user ear and the vertical-displacement information to supply a recognition signal indicative of recognition of the gesture.

2. The system according to claim 1, wherein the movement sensor is an accelerometer with three axes of detection, the movement sensor configured to supply as the movement signal an acceleration signal having respective acceleration components along the three axes of detection.

3. The system according to claim 1, wherein the processing circuitry comprises:
   a first processing branch operatively coupled to the movement sensor and configured to process the movement signal to supply at an output movement information associated with recognition of the gesture;
   a second processing branch operatively coupled to the pressure sensor and configured to process the pressure signal to supply at an output vertical-displacement information associated with recognition of the gesture; and
   a fusion block operatively coupled to the first and second processing branches and configured to implement the joint-analysis algorithm based on the movement information supplied by the first processing branch and the vertical-displacement information supplied by the second processing branch, the fusion block configured to supply at an output the recognition signal indicative of recognition of the gesture.

4. The system according to claim 3, wherein the first processing branch comprises:
   a movement-detection stage configured to process the movement signal to recognize a movement associated with the gesture and to generate the corresponding movement information, wherein the movement-detection stage includes:
      a pattern-detection block configured to analyze variation of the movement signal to verify the presence of the pattern compatible with the gesture and, if the presence of the pattern is verified, to provide the trigger signal; and
      a final-position detection block coupled to the pattern-detection block and configured, in response to receiving the trigger signal, to evaluate, based the movement signal, whether the final position of the mobile electronic device is compatible with the orientation of the mobile electronic device at the user ear.

5. The system according to claim 4, wherein the movement sensor is an accelerometer with three axes of detection, the accelerometer configured to provide, as the movement signal, an acceleration signal having respective acceleration components along the three axes of detection; wherein the pattern-detection block is configured to analyze, at a current instant of time, the variation of the movement signal with respect to a previous instant, and, in response to the variation being higher than a threshold, to generate the trigger signal; and wherein the final-position detection block is configured to analyze values of the acceleration components along the three axes of detection to determine whether the corresponding position of the mobile electronic device is compatible with a position proximate the user ear.

6. The system according to claim 3, wherein the fusion block is configured to generate the recognition signal having a value indicative of a correct recognition of the gesture in response to the displacement associated with the vertical-displacement information being consistent with a movement to the user ear, and a value associated with the movement information is higher than a selectable threshold.

7. The system according to claim 3, wherein the fusion block comprises an AND logic block which receives the movement information and the vertical-displacement information and generates the recognition signal through an AND logic combination of the movement information and the vertical-displacement information.

8. The system according to claim 1, wherein the processing circuitry does not utilize a proximity sensor for recognition of the gesture.

9. A system for recognition of a gesture of bringing a mobile electronic device to a user ear, the system comprising:
   a movement sensor configured to provide a movement signal indicative of a movement of the mobile electronic device;
   a pressure sensor configured to provide a pressure signal indicative of a pressure acting on the mobile electronic device during the movement; and
   processing circuitry operatively coupled to the movement sensor and to the pressure sensor, and configured to perform a joint processing of the movement signal and the pressure signal to recognize the gesture, wherein the processing circuitry, in operation:
   preconditions the movement signal using filtering;
   analyzes variations of the preconditioned movement signal to verify presence of a pattern compatible with a gesture and, if the presence of the pattern is verified, provides a trigger signal; and
   in response to receiving the trigger signal, evaluates, based on the preconditioned movement signal, whether a final position of the mobile electronic device is compatible with an orientation of the mobile electronic device at the user ear.

10. The system according to claim 9, wherein the processing circuitry comprises:
    a displacement-determination stage configured to process the pressure signal to determine the vertical displacement of the mobile electronic device as a result of the movement, the displacement-determination stage being configured to determine a difference between a current measurement of pressure or altitude associated with the pressure, and a previous measurement of pressure or altitude associated with the pressure, to determine the vertical displacement and generate the vertical-displacement information.

11. The system according to claim 10, wherein the processing circuitry is configured to receive at an input the pressure signal and to pre-condition the pressure signal via filtering, and to provide at an output a filtered pressure signal; wherein the displacement-determination stage is coupled to the filtering stage to receive the filtered pressure signal.

12. A mobile electronic device, comprising:
    a recognition system configured to detect a gesture of bringing a mobile electronic device to an ear of a user of the mobile electronic device, the recognition system configured to be integrated in the mobile electronic device and including:
    a movement sensor configured to generate a movement signal responsive to a movement of the mobile electronic device;
    a pressure sensor configured to generate a pressure signal responsive to a pressure acting on the mobile electronic device; and
    a processing circuit coupled to the movement sensor and to the pressure sensor, the processing circuit configured to process the movement signal and the pressure signal to detect the gesture of bringing the mobile electronic device to the ear of the user; and
    a control unit, coupled to the recognition system and configured to activate functions of the mobile electronic device in response to detection of the gesture, wherein the processing circuit, in operation,
    preconditions the pressure signal using filtering;
    processes the preconditioned pressure signal to determine a vertical displacement of the mobile electronic device as a result of the movement, the processing of the pressure signal including determining a difference between a current measurement of pressure or altitude associated with the pressure, and a previous measurement of pressure or altitude associated with the pressure, to determine the vertical displacement and generate vertical-displacement information;
    preconditions the movement signal using filtering;
    analyzes variations of the preconditioned movement signal to verify presence of a pattern compatible with a gesture and, if the presence of the pattern is verified, provides a trigger signal; and
    in response to receiving the trigger signal, jointly processes the preconditioned movement signal and preconditioned pressure signal to recognize a gesture of bringing the mobile electronic device to the user ear.

13. The mobile electronic device according to claim 12, wherein the mobile electronic device includes mobile-communications capacity, and wherein the control unit is configured to handle an incoming call in response to detection of the gesture.

14. The mobile electronic device of claim 13, wherein the movement sensor comprises an accelerometer having an X axis of detection, a Y axis of detection, and a Z axis of detection, the X, Y and Z axes of detection arranged according to the East North Up convention, respectively.

15. A method, comprising:
    generating a movement signal indicative of a movement of the mobile electronic device to a user ear;
    generating a pressure signal indicative of a pressure acting on the mobile electronic device during the movement;
    preconditioning the pressure signal using filtering;
    processing the preconditioned pressure signal to determine a vertical displacement of the mobile electronic device as a result of the movement, the processing of the pressure signal including determining a difference between a current measurement of pressure or altitude associated with the pressure, and a previous measurement of pressure or altitude associated with the pressure, to determine the vertical displacement and generate vertical-displacement information;
    preconditioning the movement signal using filtering;
    analyzing variations of the preconditioned movement signal to verify presence of a pattern compatible with a gesture and, if the presence of the pattern is verified, provides a trigger signal; and
    in response to receiving the trigger signal, jointly processing the preconditioned movement signal and preconditioned pressure signal to recognize a gesture of bringing the mobile electronic device to the user ear.

16. The method according to claim 15 wherein analyzing the movement information and vertical-displacement information comprises generating the recognition signal having a value indicative of a correct recognition of the gesture in response to the displacement associated with the vertical-displacement information being consistent with a movement to the user ear, and a value associated with the movement information being higher than a selectable threshold.

17. The method according to claim 15, wherein recognizing the gesture does not include use of proximity information from a proximity sensor.

\* \* \* \* \*